United States Patent
Zeng et al.

(10) Patent No.: US 10,430,929 B2
(45) Date of Patent: Oct. 1, 2019

(54) SYSTEM AND METHOD FOR PROCESSING A DATA STRUCTURE

(71) Applicant: City University of Hong Kong, Kowloon (HK)

(72) Inventors: Wen Jun Zeng, Shek Kip Mei (HK); Hing Cheung So, Kowloon (HK)

(73) Assignee: CITY UNIVERSITY OF HONG KONG, Kowloon (HK)

( * ) Notice: Subject to any disclaimer, the term of this patent is extended or adjusted under 35 U.S.C. 154(b) by 93 days.

(21) Appl. No.: 15/491,013

(22) Filed: Apr. 19, 2017

(65) Prior Publication Data
US 2018/0308223 A1 Oct. 25, 2018

(51) Int. Cl.
*G06T 5/00* (2006.01)
*G06F 16/25* (2019.01)

(52) U.S. Cl.
CPC ............ *G06T 5/005* (2013.01); *G06F 16/258* (2019.01); *G06T 2207/20076* (2013.01)

(58) Field of Classification Search
None
See application file for complete search history.

(56) References Cited

U.S. PATENT DOCUMENTS

2016/0232175 A1* 8/2016 Zhou .................. G06T 1/20

OTHER PUBLICATIONS

E. J. Candès and Y. Plan, "Matrix completion with noise," Proceedings of the IEEE, vol. 98, No. 6, pp. 925-936, Jun. 2010.
J.-F. Cai, E. J. Candès and Z. Shen, "A singular value thresholding algorithm for matrix completion," SIAM Journal on Optimization, vol. 20, No. 4, pp. 1956-1982, 2010.
P. Jain, R. Meka and I. S. Dhillon, "Guaranteed rank minimization via singular value projection," Advances in Neural Information Processing Systems , pp. 937-945, 2010.
Y. Koren, R. Bell and C. Volinsky, "Matrix factorization techniques for recommender systems," Computer, vol. 42, No. 8, pp. 30-37, 2009.
R. H. Keshavan, A. Montanari and S. Oh, "Matrix completion from a few entries," IEEE Transactions on Information Theory, vol. 56, No. 6, pp. 2980-2998, Jun. 2010.
R. Sun and Z.-Q. Luo, "Guaranteed matrix completion via nonconvex factorization," IEEE Transactions on Information Theory, vol. 62, No. 11, pp. 6535-6579, Nov. 2016.
G. Marjanovic and V. Solo, "On optimization and matrix completion," IEEE Transactions on Signal Processing, vol. 60, No. 11, pp. 5714-5724, Nov. 2012.
J. Liu, P. Musialski, P. Wonka and J. Ye, "Tensor completion for estimating missing values in visual data," IEEE Transactions on Pattern Analysis and Machine Intelligence, vol. 35, No. 1, pp. 208-220, Jan. 2013.

* cited by examiner

*Primary Examiner* — Michael D. Yaary
(74) *Attorney, Agent, or Firm* — Renner Kenner Greive Bobak Taylor & Weber

(57) ABSTRACT

A system and a method for processing a data structure includes the steps of: providing an incomplete data structure arranged to represent source information; processing the incomplete data structure to determine at least one estimated data element of an output data structure; and transforming the source information to output information associated with the output data structure based on a combination of the incomplete data structure and the at least one estimated data element.

26 Claims, 6 Drawing Sheets

SYSTEM AND METHOD FOR PROCESSING A DATA STRUCTURE

TECHNICAL FIELD

The present invention relates to a system and method for processing a data structure, and particularly, although not exclusively, to a system and method for matrix completion.

BACKGROUND

Data and signals may be in electronic form and may be transmitted electrically. During transmission, electronic signals may be degraded with introduced noise due to various reasons, which may further result in incomplete transmission with missing and/or noisy data at the receiving end.

In some occasion, data stored in electronic form may also encountered partial loss due to poor data management. Therefore, data processing for restoring or retrieving valuable information based on incomplete data structures may be important in various applications.

SUMMARY OF THE INVENTION

In accordance with a first aspect of the present invention, there is provided a method for processing a data structure, comprising the step of: providing an incomplete data structure arranged to represent source information; processing the incomplete data structure to determine at least one estimated data element of an output data structure; and transforming the source information to output information associated with the output data structure based on a combination of the incomplete data structure and the at least one estimated data element.

In an embodiment of the first aspect, the data structure is arranged to contain a plurality of data elements.

In an embodiment of the first aspect, the incomplete data structure contains at least one noisy data element.

In an embodiment of the first aspect, at least one of the plurality of data elements is missing in the incomplete data structure.

In an embodiment of the first aspect, the output data structure includes the at least one estimated data element filled in at least one corresponding missing entries in the incomplete data structure.

In an embodiment of the first aspect, the data structure includes a matrix filled with the plurality of data elements.

In an embodiment of the first aspect, the incomplete data structure is a low-rank matrix.

In an embodiment of the first aspect, the step of processing the incomplete data structure includes factorizing the low-rank matrix.

In an embodiment of the first aspect, the step of processing the incomplete data structure further comprises a step of $\ell_p$-norm minimization of residual with $0<p\le 2$.

In an embodiment of the first aspect, the step of processing the incomplete data structure further comprises a step of processing the factorized low-rank matrix by solving a $(n_1+n_2)$ linear $\ell_p$-regression problem, wherein $n_1$ and $n_2$ denote a row number and a column number of the low-rank matrix.

In an embodiment of the first aspect, the process of solving a $(n_1+n_2)$ linear $\ell_p$-regression problem involves an iterative process.

In an embodiment of the first aspect, the iterative process is an iteratively reweighted least squares process.

In an embodiment of the first aspect, the step of processing the incomplete data structure further comprising a step of applying an alternating direction method of multipliers in an $\ell_p$-space.

In an embodiment of the first aspect, the step of applying the alternating direction method of multipliers in an $\ell_p$-space includes solving a least squares (LS) matrix factorization problem in each of a plurality of iterations.

In an embodiment of the first aspect, the least squares matrix factorization problem is solved using a linear least squares regression process.

In an embodiment of the first aspect, the step of applying the alternating direction method of multipliers in an $\ell_p$-space includes obtaining a proximity operator of a $p^{th}$ power of the $\ell_p$-norm.

In an embodiment of the first aspect, the proximity operator includes a closed-form solution for $p=1$.

In an embodiment of the first aspect, obtaining the proximity operator of a $p^{th}$ power of the $\ell_p$-norm includes root finding of a scalar nonlinear equation for $p<1$.

In an embodiment of the first aspect, the source information is a source image including a missing portion.

In an embodiment of the first aspect, the output information is an inpainted image based on the source image.

In accordance with a second aspect of the present invention, there is provided a method for image processing, comprising the steps of: transforming a source image to a matrix representation including a data structure; processing the data structure with the method in accordance with the first aspect so as to modify the matrix representation including the output data structure; and transforming the modified matrix representation to an output image.

In an embodiment of the second aspect, the method further comprises the step of converting the source image to a gray-scale image, wherein the gray-scale image is represented by the matrix representation.

In accordance with a third aspect of the present invention, there is provided a system for use in processing a data structure, comprising: a transformation module arranged to generate an incomplete data structure representing source information; and a processing module arranged to process the incomplete data structure so as to determine at least one estimated data element of an output data structure; wherein the transformation module is further arranged to transform the source information to output information associated with the output data structure based on a combination of the incomplete data structure and the at least one estimated data element.

In an embodiment of the third aspect, the data structure is arranged to contain a plurality of data elements.

In an embodiment of the third aspect, the incomplete data structure contains at least one noisy data element.

In an embodiment of the third aspect, at least one of the plurality of data elements is missing in the incomplete data structure.

In an embodiment of the third aspect, the output data structure includes the at least one estimated data element filled in at least one corresponding missing entries in the incomplete data structure.

In an embodiment of the third aspect, the data structure includes a matrix filled with the plurality of data elements.

In an embodiment of the third aspect, the incomplete data structure is a low-rank matrix.

In an embodiment of the third aspect, the source information is a source image including a missing portion.

In an embodiment of the third aspect, the output information is an inpainted image based on the source image.

In an embodiment of the third aspect, the transformation module is further arranged to convert the source image to a gray-scale image, wherein the gray-scale image is represented by the incomplete data structure.

BRIEF DESCRIPTION OF THE DRAWINGS

Embodiments of the present invention will now be described, by way of example, with reference to the accompanying drawings in which.

DETAILED DESCRIPTION OF THE PREFERRED EMBODIMENT

The inventors have, through their own research, trials and experiments, devised that matrix completion may refer to recovery of a low-rank matrix. The recovery process may be based on only a subset of possibly noisy entries of the initial matrix.

Preferably, matrix completion may involve finding missing entries of a low-rank matrix from incomplete and/or noisy observations. The inventors devised that many real-world signals may be approximated by matrices whose ranks are much smaller than their column and row lengths.

For example, matrix completion may be used to predict user preferences with the use of a database of over 100 million movie ratings made by 480,189 users in 17,770 films, which corresponds to the task of completing a matrix with around 99% missing entries. A report may be generated based on the actual preferences and the matrix completion results.

Preferably, matrix completion may be formulated as a constrained rank minimization problem, but it is generally NP-hard. Nevertheless, it can be relaxed via nuclear norm minimization and a typical solver is the singular value thresholding (SVT) method which requires full singular value decomposition (SVD). Assuming that the rank is known, matrix recovery can also be tackled via iterative hard thresholding approach including the singular value projection (SVP) method where only truncated SVD is needed.

In another example, matrix factorization may be applied. The unknown matrix may be modelled as a product of two much smaller matrices so that the low-rank property is automatically fulfilled. However, some of these matrix completion methods may not work well when the observations contain outliers because their derivation is based on the $\ell_2$-space or Gaussian noise assumption. In fact, the validity of the Gaussian distribution may be at best approximate in reality, however the occurrence of non-Gaussian impulsive noise may also exist. For example, the impulsive salt-and-pepper noise commonly arises in image processing and imaging.

Figure 1:
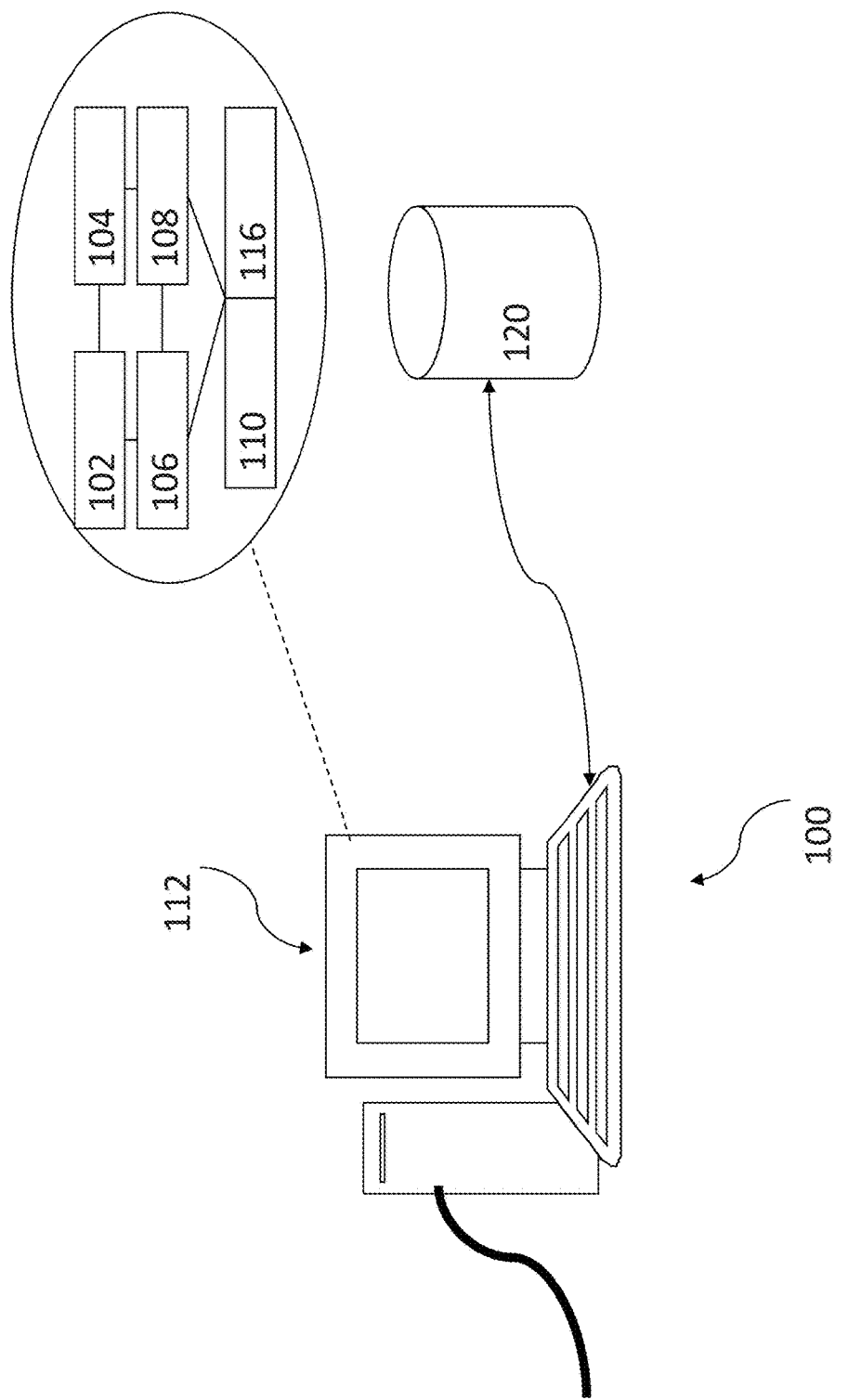
FIG. 1 is a schematic diagram of a computing server for operation as a system for use in processing a data structure in accordance with one embodiment of the present invention.

With reference to FIG. 1, an embodiment of the present invention is illustrated. This embodiment is arranged to provide a system for use in processing a data structure, comprising: a transformation module arranged to generate an incomplete data structure representing source information; and a processing module arranged to process the incomplete data structure so as to determine at least one estimated data element of an output data structure; wherein the transformation module is further arranged to transform the source information to output information associated with the output data structure based on a combination of the incomplete data structure and the at least one estimated data element.

Preferably, in one example, the system may be used to process a source image including a missing portion. By using the matrix completion method in accordance with the embodiments of the present invention, the missing portion may be estimated based on the other portions and/or information of the source image, and therefore the source image may be recovered with the estimation.

In this embodiment, the transformation module and the processing module are implemented by or for operation on a computer having an appropriate user interface. The computer may be implemented by any computing architecture, including stand-alone PC, client/server architecture, "dumb" terminal/mainframe architecture, or any other appropriate architecture. The computing device is appropriately programmed to implement the invention.

Referring to FIG. 1, there is shown a schematic diagram of a computer or a computing server 100 which in this embodiment comprises a server 100 arranged to operate, at least in part if not entirely, the system for use in processing a data structure in accordance with one embodiment of the invention. The server 100 comprises suitable components necessary to receive, store and execute appropriate computer instructions. The components may include a processing unit 102, read-only memory (ROM) 104, random access memory (RAM) 106, and input/output devices such as disk drives 108, input devices 110 such as an Ethernet port, a USB port, etc. Display 112 such as a liquid crystal display, a light emitting display or any other suitable display and communications links 114. The server 100 includes instructions that may be included in ROM 104, RAM 106 or disk drives 108 and may be executed by the processing unit 102. There may be provided a plurality of communication links 114 which may variously connect to one or more computing devices such as a server, personal computers, terminals, wireless or handheld computing devices. At least one of a plurality of communications link may be connected to an external computing network through a telephone line or other type of communications link.

The server may include storage devices such as a disk drive 108 which may encompass solid state drives, hard disk drives, optical drives or magnetic tape drives. The server 100 may use a single disk drive or multiple disk drives. The server 100 may also have a suitable operating system 116 which resides on the disk drive or in the ROM of the server 100.

The system has a database 120 residing on a disk or other storage device which is arranged to store at least one record 122. The database 120 is in communication with the server 100 with an interface, which is implemented by computer software residing on the server 100.

Alternatively, the database 120 may also be implemented as a stand-alone database system in communication with the server 100 via an external computing network, or other types of communication links.

Figure 2:
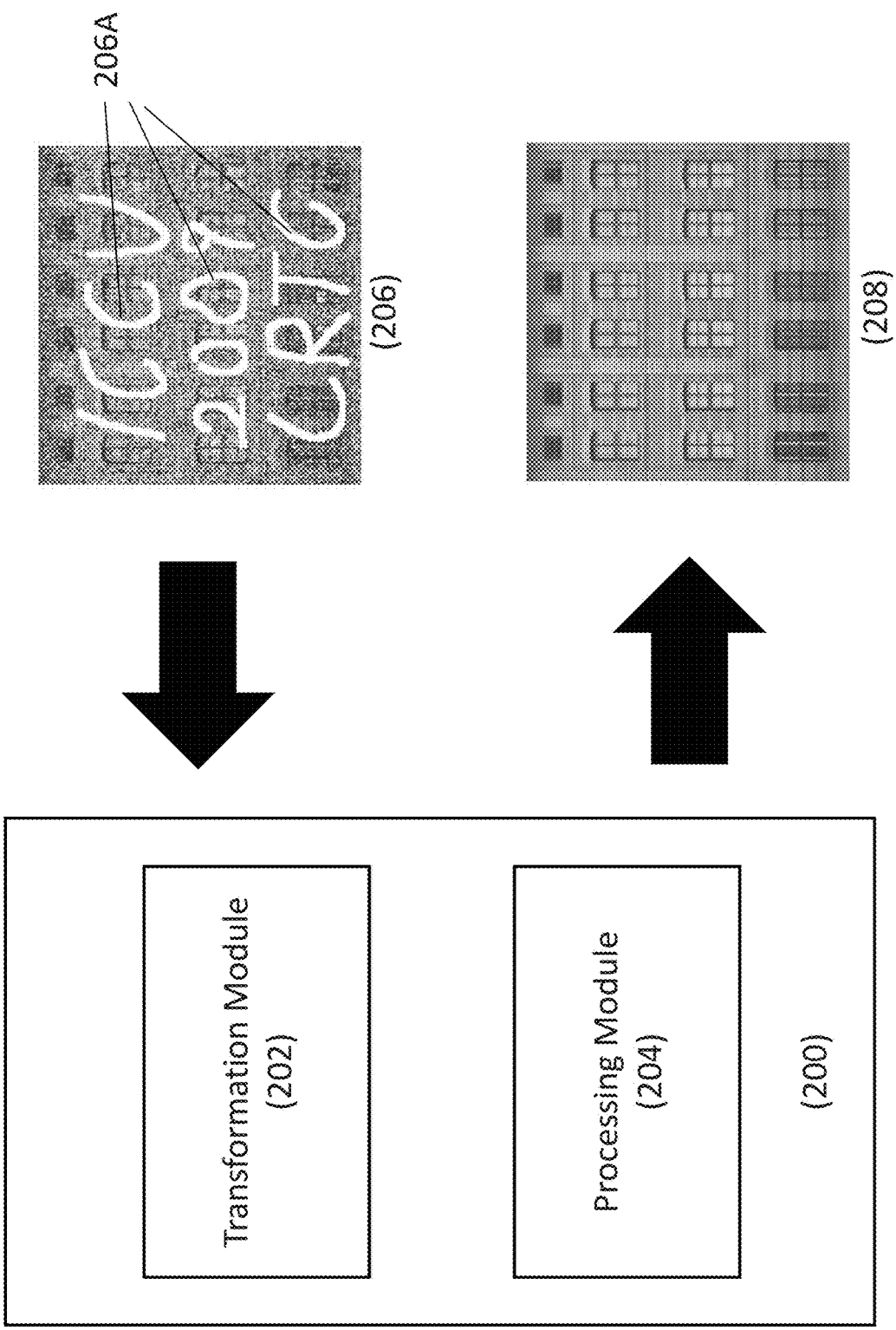
FIG. 2 is a schematic diagram of an embodiment of the system for processing an image in accordance with one embodiment of the present invention, wherein a source image is processed and transformed to an inpainted image based on a matrix completion method.

With reference to FIG. 2, there is shown an embodiment of the system for use in processing a data structure 200. In this embodiment, the system is used to process source information having a data structure. The data structure contains a plurality of data elements. If the data structure is incomplete, i.e. at least one of the plurality of data elements is missing in the incomplete data structure, the system may attempt to process and complete the data structure by determining at least one estimated data element of an output data structure.

Preferably, the system 200 may comprise a transformation module 202 arranged to generate an incomplete data structure representing a source information 206, and a processing module 204 arranged to process the incomplete data structure so as to determine at least one estimated data element of an output data structure. The transformation module 202 may then transform the source information 206 to output information 208 associated with the output data structure determined by the processing module 204.

Referring to FIG. 2, the source information is a source image 206 and the output information is an output inpainted image 208. The source image 206 includes one or more missing portion 206A. When the source image is represented by a data structure or transformed into a matrix representation including the data structure, the matrix and the data structure is incomplete with a plurality of entries corresponding to the missing image data. For example, the matrix representation may include a plurality of data element representing the image pixels of the source image 206.

As discussed earlier in this disclosure, matrix completion technology may be applied so as to fill the incomplete matrix with estimated data elements and thus completing the matrix, by combining the incomplete data structure and the estimated data element. Subsequently, the modified matrix may be transformed to form an output image 208. Hence, the source image 206 may be transformed to an inpainted image 208 as output information provided by the system 200.

In this example, the output data structure includes the at least one estimated data element filled in the corresponding missing entries in the incomplete data structure. The "blanks" 206A in the source image 206 is filled with image portions which are estimated based on the other parts of the source information 206.

Preferably, the incomplete data structure is a low-rank matrix, and the processing of the incomplete data structure preferably includes factorizing the low-rank matrix and $\ell_p$-norm minimization of residual with $0<p\leq 2$. The process may include iteratively solving $(n_1+n_2)$ linear $\ell_p$-regression problems, where $n_1$ and $n_2$ represent the numbers of row and column of the incomplete/target matrix, respectively. The process may also apply an alternating direction method of multipliers (ADMM) for low-rank matrix factorization employing the incomplete entries in the $\ell_p$-space.

Preferably, there is one user-defined parameter in the invention, namely, the target rank, which is not difficult to determine in practical applications.

The process may begin with letting $M_\Omega \in \mathbb{R}^{n_1 \times n_2}$ be a matrix with missing entries where $\Omega$ is a subset of the complete set of entries $[n_1] \times [n_2]$, with $[n]$ being the list $\{1, \ldots, n\}$. The $(i,j)$ entry of $M_\Omega$, denoted by $m_{\Omega i,j}$, can be written as:

$$m_{\Omega i,j} = \begin{cases} m_{i,j} & \text{if } (i,j) \in \Omega \\ 0, & \text{otherwise} \end{cases} \quad (1)$$

$\{m_{i,j}\}$ are the available observations. The task of matrix completion is to find $X \in \mathbb{R}^{n_1 \times n_2}$ given $M_\Omega$ by incorporating the low-rank information. Mathematically, it is formulated as a rank minimization problem:

$$\min_X \text{rank}(X) \text{ s.t. } X_\Omega = M_\Omega. \quad (2)$$

Preferably, among all matrices consistent with the observed entries, the solution is the one with the minimum rank. In the presence of additive zero-mean noise, (2) can be modified as:

$$\min_X \text{rank}(X) \text{ s.t. } \|X_\Omega - M_\Omega\|_F^2 \leq \epsilon_F \quad (3)$$

where $\|\bullet\|_F$ denotes the Frobenius norm of a matrix and $\epsilon_F>0$ is a tolerance parameter that controls the fitting error. Unfortunately, the rank minimization problem of (2) or (3) is NP-hard. One standard approach is to replace the non-convex rank by the convex nuclear norm where full/truncated SVD is required, which is computationally demanding particularly when $n_1$ or $n_2$ is large. Another popular direction which avoids performing SVD is to apply matrix factorization:

$$\min_{U,V} f_2(U,V) := \|(UV)_\Omega - M_\Omega\|_F^2 \quad (4)$$

where $U \in \mathbb{R}^{n_1 \times r}$ and $V \in \mathbb{R}^{r \times n_2}$ with r being the target rank which is a user-defined parameter. After solving U and V, the solution is obtained as X=UV. In an embodiment of the present invention, (4) may be generalized by replacing the Frobenius norm by the $\ell_p$-norm where $0<p\leq 0.2$ to design an efficient matrix completion approach even when $M_\Omega$ contains outlier measurements:

$$\min_{U,V} f_p(U,V) := \|(UV)_\Omega - M_\Omega\|_p^p \quad (5)$$

where $\|\bullet\|_p$ denotes the element-wise $\ell_p$-norm of a matrix defined as:

$$\|X_\Omega\|_p = \left(\sum_{(i,j)\in\Omega} |x_{i,j}|^p\right)^{1/p}. \quad (6)$$

Preferably, (5) may be solved by adopting the alternating minimization strategy:

$$V^{k+1} = \underset{V}{\arg\min} \|(U^k V)_\Omega - M_\Omega\|_p^p \qquad (7)$$

and $$U^{k+1} = \underset{U}{\arg\min} \|(UV^{k+1})_\Omega - M_\Omega\|_p^p \qquad (8)$$

where the transformation is initialized with $U^0$ and $U^k$ represents the estimate of U at the kth iteration.

Subsequently, (7) may be solved for a fixed U:

$$\min_V f_p(V) := \|(UV)_\Omega - M_\Omega\|_p^p \qquad (9)$$

where the superscript $(\cdot)^k$ is dropped for notational simplicity. By denoting the i th row of U and the j th column of V as $u_i^T$ and $v_j$, respectively, where $u_i, v_j \in \mathbb{R}^r$, $i=1, \ldots, n_1$, $j=1, \ldots, n_2$, (9) can be rewritten as $$\min_V f_p(V) := \sum_{(i,j) \in \Omega} |u_i^T v_j - m_{i,j}|^p. \qquad (10)$$

Because $f_p(V)$ is decoupled with respect to $v_j$, (10) is equivalent to solving the following $n_2$ independent subproblems:

$$\min_{v_j} f_p(v_j) := \sum_{i \in \mathcal{I}_j} |u_i^T v_j - m_{i,j}|^p, \; j=1, \ldots, n \qquad (11)$$

where $\mathcal{I}_j = \{j_1, \ldots, j_{|\mathcal{I}_j|}\} \subseteq \{1, \ldots, n_1\}$ denotes the set containing the row indices for the jth column in $\Omega$. Here $|\mathcal{I}_j|$ stands for the cardinality of $\mathcal{I}_j$ and in general $|\mathcal{I}_j| > r$.

As an illustration, $\mathcal{I}_j$ is determined as follows. Consider $M_\Omega \in \mathbb{R}^{4 \times 3}$:

$$M_\Omega = \begin{bmatrix} 0 & \times & 0 \\ \times & 0 & \times \\ 0 & \times & \times \\ \times & 0 & \times \end{bmatrix} \qquad (12)$$

where the observed and missing entries are denoted by x and 0, respectively. For j=1, the (2,1) and (4,1) entries are observed, thus $\mathcal{I}_1 = \{2,4\}$. In addition, $\mathcal{I}_2 = \{1,3\}$ and $\mathcal{I}_3 = \{2,3,4\}$. Apparently, $\sum_{j=1}^{n_2} |\mathcal{I}_j| = |\Omega|$. Defining a matrix $U_{\mathcal{I}_j} \in \mathbb{R}^{|\mathcal{I}_j| \times r}$ containing the $|\mathcal{I}_j|$ rows indexed by $\mathcal{I}_j$:

$$U_{\mathcal{I}_j} = \begin{bmatrix} u_{j_1}^T \\ \vdots \\ u_{j_{|\mathcal{I}_j|}}^T \end{bmatrix} \qquad (13)$$

and a vector $b_{\mathcal{I}_j} = [m_{j_1,j}, \ldots, m_{j_{|\mathcal{I}_j|},j}]^T \in \mathbb{R}^{|\mathcal{I}_j|}$, then (11) is compactly rewritten as $$\min_{v_j} f_p(v_j) := \|U_{\mathcal{I}_j} v_j - b_{\mathcal{I}_j}\|_p^p \qquad (14)$$

which is a robust linear regression in $\ell_p$-space. For p=2, (14) is a linear least squares (LS) problem with solution being $v_j = U_{\mathcal{I}_j}^\dagger b_{\mathcal{I}_j}$, and the corresponding computational complexity is $\mathcal{O}(|\mathcal{I}_j|r^2)$.

For 0<p<2, the $(n_1+n_2)$ linear $\ell_p$-regression of (14) may be solved by an iterative process, such as the iteratively reweighted least squares (IRLS) process where global convergence can be achieved for the convex case of p≥2 while only a stationary point is obtained for the nonconvex case of p<1. At the tth iteration, the IRLS solves the following weighted LS problem:

$$v_j^{t+1} = \underset{v_j}{\arg\min} \|W^t(U_{\mathcal{I}_j} v_j - b_{\mathcal{I}_j})\|_2^2 \qquad (15)$$

where $W^t = \mathrm{diag}(w_1^t, \ldots, w_{n_1}^t)$ is a diagonal weighting matrix with the ith diagonal element being $$w_i^t = \frac{1}{(|e_i^t|^2 + \epsilon)^{\frac{1-p/2}{2}}}. \qquad (16)$$

The $e_i^t$ is the i th element of the residual vector $e^t = U_{\mathcal{I}_j} v_j^t - b_{\mathcal{I}_j}$ and $\epsilon > 0$ is a small positive parameter to avoid division by zero and ensure numerical stability, especially for p≤1. In one example, a value of $\epsilon$ is taken as $\epsilon = 100\epsilon_{machine}$ with $\epsilon_{machine}$ being the machine precision. Only an LS problem is required to solve in each iteration of the IRLS. Therefore, the complexity of the $\ell_p$-regression in (14) is $\mathcal{O}(|\mathcal{I}_j|r^2 N_{IRLS})$ where $N_{IRLS}$ is the iteration number required for the IRLS to converge. Since the IRLS has a fast convergence rate, $N_{IRLS}$ will not be large, with a typical value of several tens, and is independent of the problem dimension. The total complexity for solving the $n_2$ $\ell_p$-regressions of (10) is $\mathcal{O}(|\Omega|r^2 N_{IRLS})$ due to $\sum_{j=1}^{n_2} |\mathcal{I}_j| = |\Omega|$.

Since (7) and (8) have the same structure, (8) may be solved in the same manner. The ith row of U is updated by $$\min_{u_i^T} \|u_i^T V_{\mathcal{J}_i} - b_{\mathcal{J}_i}^T\|_p^p \qquad (17)$$

where $\mathcal{J}_i = \{i_1, \ldots, i_{|\mathcal{J}_i|}\} \subseteq \{1, \ldots, n_2\}$ is the set containing the column indices for the ith row in $\Omega$. Using (12) again, only the (1,2) entry is observed for i=1, and thus $\mathcal{J}_1 = \{2\}$. In addition, $\mathcal{J}_2 = \{1,3\}$, $\mathcal{J}_3 = \{2,3\}$, and $\mathcal{J}_4 = \{1,3\}$. Here, $V_{\mathcal{J}_i} \in \mathbb{R}^{r \times |\mathcal{J}_i|}$ contains the $|\mathcal{J}_i|$ columns indexed by $\mathcal{J}_i$ and $$b_{\mathcal{J}_i}^T = [m_{i,i_1}, \ldots, m_{i,i_{|\mathcal{J}_i|}}]^T \in \mathbb{R}^{|\mathcal{J}_i|}.$$

The complexity of solving (17) is $\mathcal{O}(|\mathcal{J}_i|r^2 N_{IRLS})$ and hence the total complexity for solving the $n_1$ $\ell_p$-regressions is $\mathcal{O}(|\Omega|r^2 N_{IRLS})$ because $\sum_{i=1}^{n_1} |\mathcal{J}_i| = |\Omega|$.

The iterative $\ell_p$-regression for matrix completion is summarized as the process below. The complexity for a k-iteration is $\mathcal{O}(|\Omega|r^2 N_{IRLS})$. For the special case at p=2, the process reduces to solving the problem of (4). In this case, $N_{IRLS}=1$ and the complexity reduces to $\mathcal{O}(|\Omega|r^2)$ per k-iteration. In some examples, the number of observed entries is much smaller than the number of total entries, that is, $|\Omega|\ll n_1 n_2$. Thus, the process may become more computationally efficient as the percentage of the observations decreases.

---

Process 1:

---

Input: $M_\Omega$, $\Omega$, and rank r
   Initialize: Randomly initialize $U^0 \in \mathbb{R}^{n_1 \times r}$
   Determine $\{\mathcal{I}_j\}_{j=1}^{n_2}$ and $\{\mathcal{J}_i\}_{i=1}^{n_1}$ according to $\Omega$.
   for k = 0, 1, . . . do
     // Fix $U^k$, optimize V
     for j = 1, 2, . . . , $n_2$ do $$v_j^{k+1} \leftarrow \arg\min_{v_j} \|U_{\mathcal{I}_j}^k v_j - b_{\mathcal{I}_j}\|_p^p$$

end for
     // Fix $V^{k+1}$, optimize U
     for i = 1, 2, . . . , $n_1$ do $$(u_i^T)^{k+1} \leftarrow \arg\min_{u_i^T} \|u_i^T V_{\mathcal{J}_i}^{k+1} - b_{\mathcal{J}_i}^T\|_p^p$$

end for
     Stop if a termination condition is satisfied.
   end for
Output: $X = U^{k+1} V^{k+1}$

---

Advantageously, the total complexity of the iterative $\ell_p$-regression is $\mathcal{O}(|\Omega|r^2 N_{IRLS} K_{reg})$ where $K_{reg}$ is the number of outer iterations, namely, the k-iteration. A value of several tens of $K_{reg}$ is sufficient for convergence. In addition, the $n_2$ problems of (14) and $n_1$ problems of (17) are independent and hence can be solved using parallel computing. This may allow parallel/distributed realization, and therefore is suitable for big-data applications where the matrix sizes are very large.

In an alternative embodiment, the system 200 may perform the step of processing the incomplete data structure which further comprises a step of applying an alternating direction method of multipliers (ADMM) in an $\ell$ p-space. At each iteration of the ADMM, it requires solving a LS matrix factorization problem and calculating the proximity operator of the pth power of the $\ell_p$-norm.

Preferably, the LS factorization may be efficiently solved using linear LS regression while the proximity operator has closed-form solution for p=1 or can be obtained by root finding of a scalar nonlinear equation for p<1.

The ADMM process begins with introducing $Z_\Omega = (UV)_\Omega - M_\Omega$, and (4) is equivalent to the linearly constrained problem:

$$\min_{U,V,Z_\Omega} \|Z_\Omega\|_p^p \quad \text{s.t.} \quad Z_\Omega = (UV)_\Omega - M_\Omega. \quad (18)$$

Note that $z_{\Omega i,j}=0$ if $(i,j)\notin\Omega$. The augmented Lagrangian of (18) is:

$$\mathcal{L}_\rho(U, V, Z_\Omega, \Lambda_\Omega) = \qquad (19)$$
$$\|Z_\Omega\|_p^p + \langle \Lambda_\Omega, (UV)_\Omega - Z_\Omega - M_\Omega \rangle + \frac{\rho}{2}\|(UV)_\Omega - Z_\Omega - M_\Omega\|_F^2$$

where $\Lambda_\Omega \in \mathbb{R}^{n_1 \times n_2}$ with $\lambda_{\Omega i,j}=0$ for $(i,j)\notin\Omega$ contains $|\Omega|$ Lagrange multipliers (dual variables), $\langle A,B \rangle = \Sigma_{i,j} a_{i,j} b_{i,j}$ represents the inner product of A and B, and $\rho>0$ is the penalty parameter. The Lagrange multiplier method solves the constrained problem of (18) by finding a saddle point of the augmented Lagrangian:

$$\max_{\Lambda_\Omega} \min_{U,V,Z_\Omega} \mathcal{L}_\rho(U, V, Z_\Omega, \Lambda_\Omega). \quad (20)$$

ADMM uses the following iteration steps:

$$(U^{k+1}, V^{k+1}) = \arg\min_{U,V} \mathcal{L}_\rho(U, V, Z_\Omega^k, \Lambda_\Omega^k) \quad (21)$$

$$Z_\Omega^{k+1} = \arg\min_{Z_\Omega} \mathcal{L}_\rho(U^{k+1}, V^{k+1}, Z_\Omega, \Lambda_\Omega^k) \quad (22)$$

and $$\Lambda_\Omega^{k+1} = \Lambda_\Omega^k + \rho(U^{k+1} V^{k+1})_\Omega - Z_\Omega^{k+1} - M_\Omega) \quad (23)$$

to determine the saddle point in (20).

Since the gradient of $\mathcal{L}_\rho(U^{k+1}, V^{k+1}, Z_\Omega^{k+1}, \Lambda_\Omega)$ with respect to (w.r.t.) $\Lambda_\Omega$ is $$\frac{\partial \mathcal{L}_\rho(U^{k+1}, V^{k+1}, Z_\Omega^{k+1}, \Lambda_\Omega)}{\partial \Lambda_\Omega} = (U^{k+1} V^{k+1})_\Omega - Z_\Omega^{k+1} - M_\Omega \quad (24)$$

It is observed that (23) adopts a gradient ascent with a step size $\rho$ to update the dual variable $\Lambda_\Omega$. ADMM updates (U,V) and $Z_\Omega$ in an alternating or sequential fashion to circumvent the difficulty in jointly minimizing w.r.t. the two primal blocks. Noting that (21) minimizes (U,V) simultaneously, (21)-(23) correspond to a two-block ADMM where convergence is guaranteed.

By ignoring the constant term independent of (U,V), the subproblem of (21) is equivalent to the following Frobenius norm minimization problem:

$$\min_{U,V} \|(Uv)_\Omega - (Z_\Omega^k - \Lambda_\Omega^k/\rho + M_\Omega)\|_F^2 \quad (25)$$

which may be solved by the iterative $\ell_2$-regression, namely, process 1 as discussed earlier with p=2, with a complexity bound of $\mathcal{O}(K_{\ell_2}|\Omega|r^2)$. Here, $K_{\ell_2}$ is the required iteration number for process 1 to converge at p=2.

On the other hand, the subproblem of (22) can be concisely expressed as $$\min_{Z_\Omega} \frac{1}{2}\|Z_\Omega - Y_\Omega^k\|_F^2 + \frac{1}{\rho}\|Z_\Omega\|_p^p \quad (26)$$

where $$Y_\Omega^k = (U^{k+1} V^{k+1})_\Omega + \Lambda_\Omega^k/\rho - M_\Omega. \quad (27)$$

Concerning the entries indexed by $\Omega$ because other entries of $Z_\Omega$ and $Y_\Omega^k$ which are not in S are zero. $z_\Omega$, $y_\Omega^k$, $\lambda_\Omega^k$, and $t_\Omega^k \in \mathbb{R}^{|\Omega|}$ are defined as the vectors that contain the entries in $\Omega$ of $Z_\Omega$, $Y_\Omega^k$, $\Lambda_\Omega^k$, and $(U^k V^k)_\Omega$ respectively, in a column-by-column manner. Preferably, (26) is equivalent to the vector optimization problem:

$$\min_{z_\Omega} \frac{1}{2}\|z_\Omega - y_\Omega^k\|_2^2 + \frac{1}{\rho}\|z_\Omega\|_p^p \tag{28}$$

where the solution defines the proximity operator of the pth power of $\ell$-norm, which may be written as $$z_\Omega^{k+1} = \text{prox}_{1/\rho}(y_\Omega^k). \tag{29}$$

After obtaining $z_\Omega^{k+1}$, $Z_\Omega^{k+1}$ may be determined. For notational simplicity, the subscripts and superscripts may be ignored as follows. $z_i$ and $y_i$ may be denoted as the ith entry of z and y for $i=1, \ldots, |\Omega|$, respectively. Because (28) is separable and hence it can be decomposed into $|\Omega|$ independent scalar problems:

$$\min_{z_i \in \mathbb{R}} g(z_i) := \frac{1}{2}(z_i - y_i)^2 + \frac{1}{\rho}|z_i|^p, \tag{30}$$

$$i = 1, \ldots, |\Omega|$$

The closed-form solution of (30) for p=1 is:

$$z_i^* = sgn(y_i)\max(|y_i| - 1/\rho, 0) \tag{31}$$

which is known as the soft-thresholding operator and can be easily computed with a marginal complexity of $\mathcal{O}(|\Omega|)$. The case of $p \in (1,2)$ is not difficult to solve but requires an iterative procedure since it does not have a closed-form solution. Since the choice of p=1 is more robust than $p \in (1,2)$ and computationally simpler, the latter is not considered. When the noise is very impulsive, the value of p<1 may be required. The solution for the scalar minimization problem of (30) with p<1 is:

$$z_i^* = \begin{cases} 0, & \text{if } |y_i| \leq \tau \\ \arg\min_{z_i \in [0, t_i]} & \text{if } |y_i| > \tau \end{cases} \tag{32}$$

where $$\tau = \left(\frac{p(1-p)}{\rho}\right)^{\frac{1}{2-p}} + \frac{p}{\rho}\left(\frac{p(1-p)}{\rho}\right)^{\frac{p-1}{2-p}} \tag{33}$$

is the threshold and $t_i = sgn(y_i)r_i$ with $r_i$ being the unique root of the nonlinear equation:

$$h(\theta) := \theta + \frac{p}{\rho}\theta^{p-1} - |y_i| = 0 \tag{34}$$

in the interval $$\left[(p(1-p)/\rho)^{\frac{1}{2-p}}, |y_i|\right]$$

where the bisection method can be applied.

Finally, an equivalent form of (23) is $$\lambda_\Omega^{k+1} = \lambda_\Omega^k + \rho(t_\Omega^{k+1} - z_\Omega^{k+1} - m_\Omega) \tag{35}$$

The operations are in terms of vectors but not matrices, and its complexity is $\mathcal{O}(|\Omega|)$. Also, at each iteration, $(UV)_\Omega$ instead of UV should be solved, whose complexity is $\mathcal{O}(|\Omega|r)$ because only $|\Omega|$ inner products $\{u_i^T v_j\}_{(i,j)\in\Omega}$ are calculated.

The steps of ADMM for robust matrix completion are summarized as follows. The $\ell_2$-norm of the residual, that is, $\|t_\Omega^k - z_\Omega^k - m_\Omega\|_2$ can be used to check for convergence. Specifically, the process is terminated when $$\|t_\Omega^k - z_\Omega^k - m_\Omega\|_2 < \delta \tag{36}$$

where $\delta > 0$ is a small tolerance parameter.

---
Process 2:
---
Input: $M_\Omega$, $\Omega$, and rank r
  Initialize: $z^0 = 0$ and $\lambda^0 = 0$
  for k = 0, 1, ... do
    1) Solve LS matrix factorization $$(U^{k+1}, V^{k+1}) = \arg\min_{U,V} \|(UV)_\Omega - (Z_\Omega^k - \Lambda_\Omega^k/\rho + M_\Omega)\|_F^2$$

using Process 1 with p = 2.
    2) Compute $Y_\Omega^k = (U^{k+1}V^{k+1})_\Omega + \Lambda_\Omega^k/\rho - M_\Omega$ and form $y_\Omega^k$ and $t_\Omega^{k+1} \leftarrow (U^{k+1}V^{k+1})_\Omega$.
    3) $z_\Omega^{k+1} \leftarrow \text{prox}_{1/\rho}(y_\Omega^k)$
    4) $\lambda_\Omega^{k+1} \leftarrow \lambda_\Omega^k + \rho(t_\Omega^{k+1} - z_\Omega^{k+1} - m_\Omega)$
    Stop if a termination condition is satisfied.
  end for
Output: $X = U^{k+1}V^{k+1}$
---

These embodiments may be advantageous in that the process may be useful in a variety of applications such as collaborative filtering, image inpainting and restoration, system identification, node localization and genotype imputation.

Advantageously, various kind of signals may be approximated by a matrix whose rank r is much smaller than the row and column numbers, denoted by $n_1$ and $n_2$, respectively. Therefore, these signals may be processed by method involving matrix transformation. The invention may be applied to recover a low-rank matrix given only a subset of its entries, possibly with impulsive noise or outliers.

The process for robust matrix completion is based on low-rank matrix factorization and $\ell_p$-norm minimization of the residual with $0 < p \leq 2$. The incomplete data structure may be processed using low-rank matrix factorization with missing data by iteratively solving $(n_1 + n_2)$ linear $\ell_p$-regression problems, and alternating direction method of multipliers (ADMM) in the $\ell_p$-space may be used.

The two processes have comparable recovery performance and computational complexity of $\mathcal{O}(K|\Omega|r^2)$, where $|\Omega|$ is the number of observed entries and K is a fixed constant of several hundreds to thousands and dimension-independent. Therefore these embodiments of the present invention are advantageous in terms of computational simplicity, statistical accuracy and outlier-robustness.

The inventors also performed experiments to evaluate the system 200 in accordance with an embodiment of the present invention. In the experiment, experimental settings are provided with $n_1=150$, $n_2=300$, and the rank is $r=10$. The method in accordance with the embodiments of the present invention are compared with alternative methods, namely, SVT and SVP. A noise-free matrix $M \in \mathbb{R}^{n_1 \times n_2}$ of rank r is generated by the product of $M_1 \in \mathbb{R}^{n_1 \times r}$ and $M_2 \in \mathbb{R}^{r \times n_2}$ whose entries satisfy the standard Gaussian distribution. 45% entries of M are randomly selected as the available observations. The normalized root mean square error (RMSE) is employed as the performance measure, which is defined as:

$$RMSE(X) = \sqrt{E\left\{\frac{\|X - M\|_F^2}{\|M\|_F^2}\right\}} \qquad (37)$$

where X is the result obtained by a matrix completion method, and is computed based on 100 independent trials.

Figure 3:
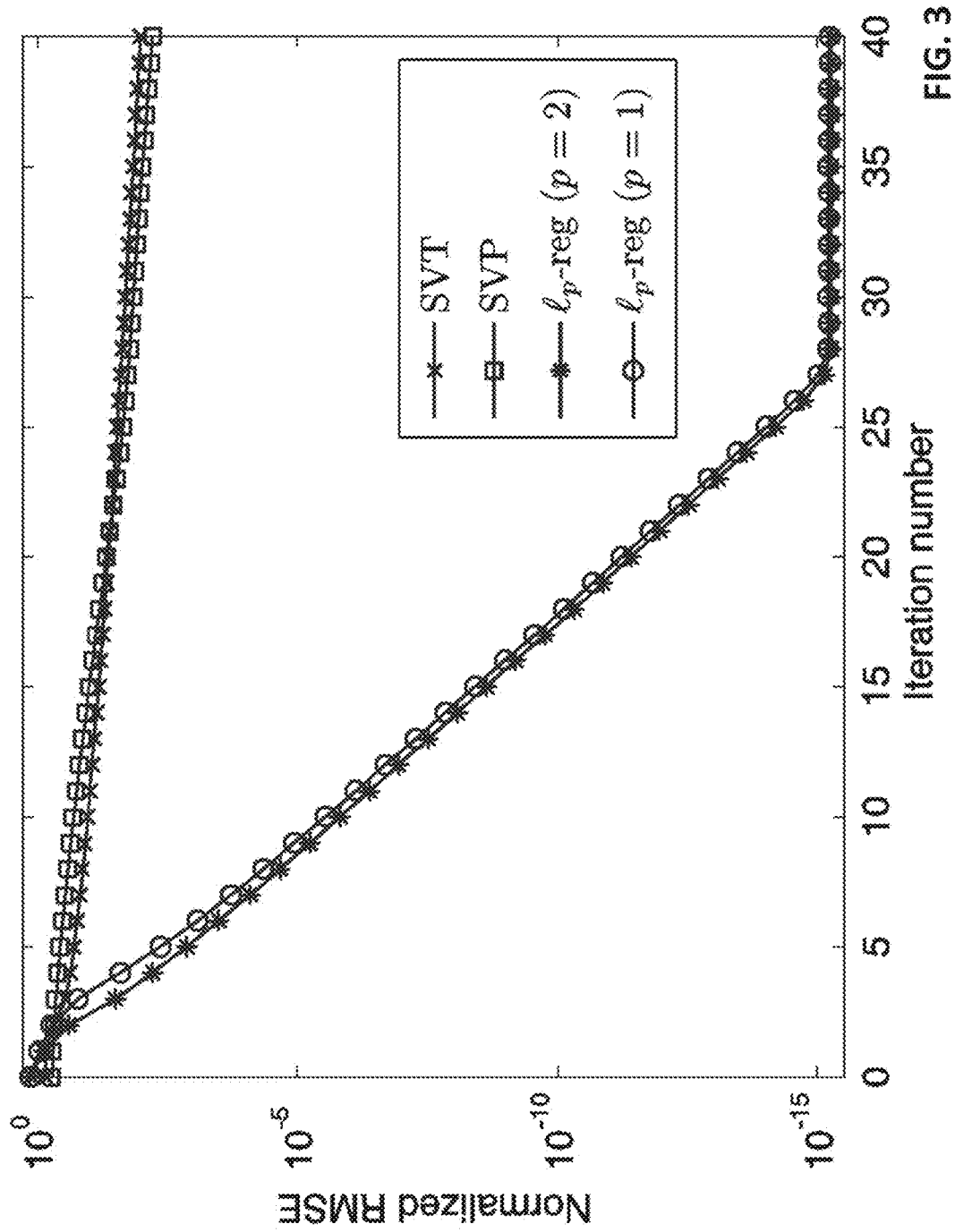
FIG. 3 is a plot showing results of normalized root mean square error (RMSE) versus iteration number in noise-free case processed with the methods in accordance with embodiments of the present invention and other alternative methods.

With reference to FIG. 3, there is provided a result of the RMSE versus iteration number in the noise-free case where $\ell_p$-reg represents the iterative $\ell_p$-regression method in process 1. The result of the ADMM is not shown because for any p, process 2 converges to the true solution in one iteration. It is observed that the SVT, SVP and $\ell_p$-regression method converge to the true matrix with a linear rate. However, the latter converges much faster and only about ten iterations are needed to obtain an accurate solution. The CPU times based on a PC with a 3.2 GHz CPU and 4 GB memory for attaining RMSE$\leq 10^{-5}$ of the SVT, SVP, $\ell_p$-regression with p=2 and p=1 and ADMM with p=1 are 10.7 s, 8.0 s, 0.28 s, 4.5 s, and 0.28 s, respectively.

The inventors also consider the noisy scenario where impulsive components are added to available entries in M. They are modeled by the two-term Gaussian mixture model (GMM) whose probability density function is given by $$p_v(v) = \sum_{i=1}^{2} \frac{c_i}{\sqrt{2\pi}\sigma_i} \exp\left(-\frac{v^2}{2\sigma_i^2}\right) \qquad (38)$$

where $0 \leq c_i \leq 1$ and $\sigma_i^2$ are the probability and variance of the ith term, respectively, with $c_1 + c_2 = 1$. If $\sigma_2^2 \gg \sigma_1^2$ and $c_2 < c_1$ are selected, large noise samples of variance $\sigma_2^2$ occurring with a smaller probability $c_2$ can be viewed as outliers embedded in Gaussian background noise of variance $\sigma_1^2$. Thus, the GMM can well model the phenomenon with both Gaussian noise and outliers. The total noise variance is $\sigma_v^2 = \Sigma_i c_i \sigma_i^2$ and the signal-to-noise ratio (SNR) is defined as $$SNR = \frac{\|M_\Omega\|_F^2}{|\Omega|\sigma_v^2}. \qquad (39)$$

Figure 4:
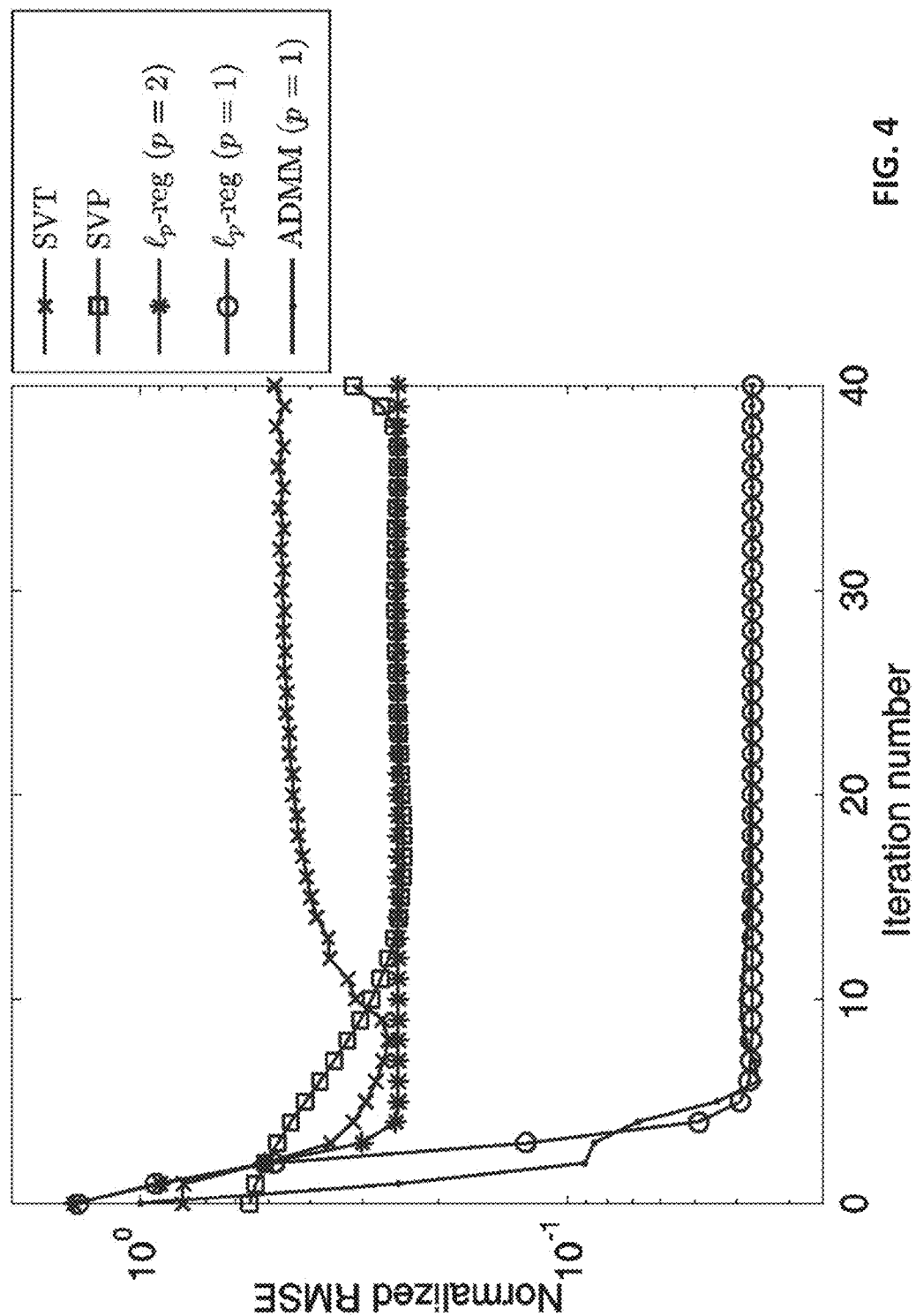
FIG. 4 is a plot showing results of normalized RMSE versus iteration number in noisy case processed with the methods in accordance with embodiments of the present invention and other alternative methods.

With reference to FIG. 4, there is provided a result of the RMSE versus iteration number in additive GMM noise at SNR=6 dB. The SVT and SVP cannot stably converge to a reasonable solution. Both $\ell_p$-regression and ADMM with p=1 converge fast, that is, in about ten iterations, to a solution with a higher accuracy while the $\ell_2$-regression cannot obtain an accurate estimation in impulsive noise. It is observed that a value of several tens for $K_{reg}$ and $K_{ADMM}$ is sufficient for convergence. Employing the stopping criteria of relative change of the current and previous iterations is less than $10^{-4}$ and (36) with $\delta = 10^{-3}$ in the $\ell_p$-regression and ADMM methods, respectively, the CPU times of the SVT, SVP, $\ell_p$-regression with p=2 and p=1 and ADMM with p=1 are 197.3 s, 10.6 s, 0.25 s, 5.2 s and 3.1 s, respectively.

Figure 5:
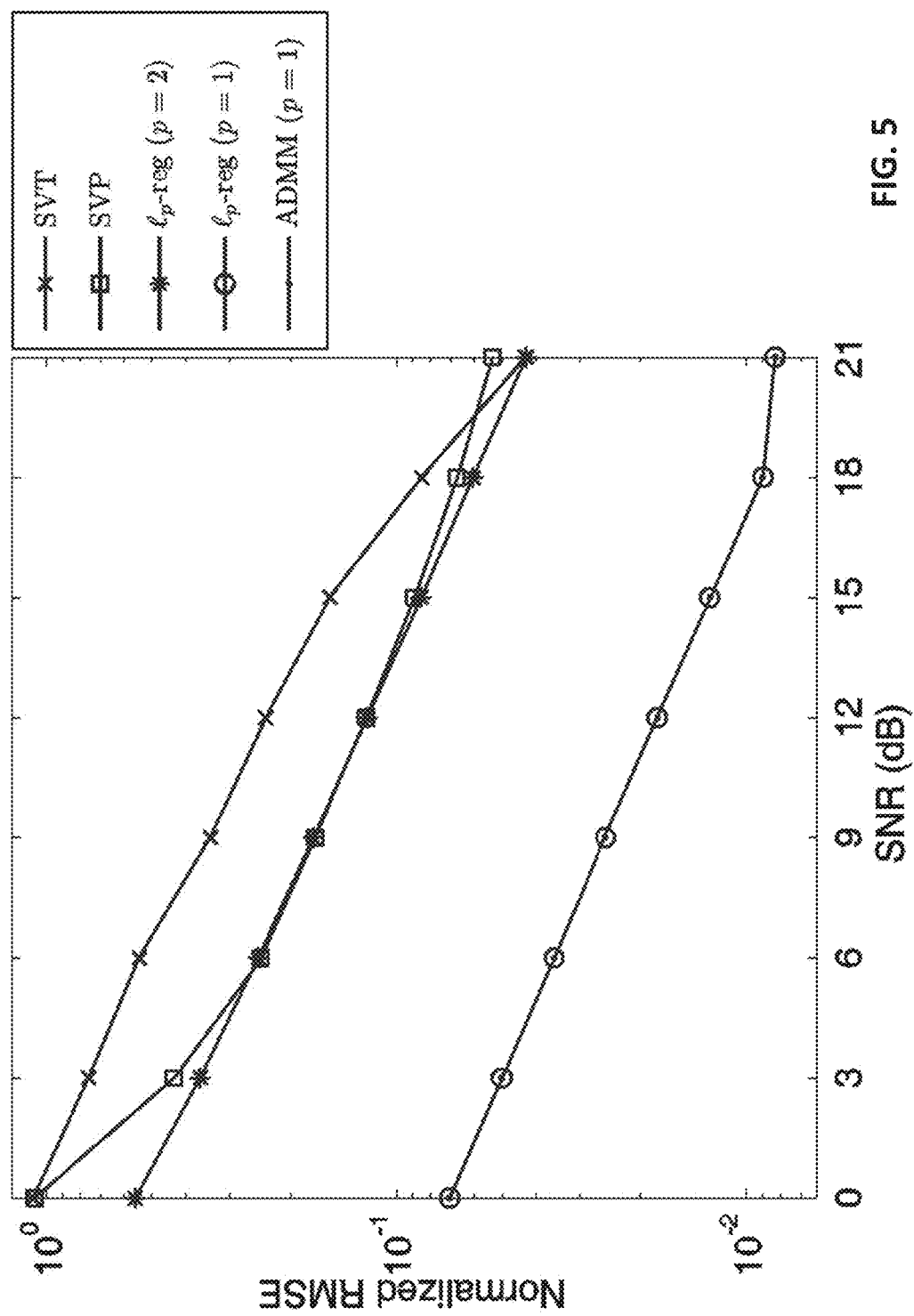
FIG. 5 is a plot showing results of normalized RMSE versus signal-to-noise ratio (SNR) processed with the methods in accordance with embodiments of the present invention and other alternative methods.

With reference to FIG. 5, there is provided a result of the RMSE versus SNR. Again, it is observed that the $\ell_p$-regression and ADMM with p=1 have the minimum RMSE for all SNRs and thus they perform better than the alternative methods. Therefore, the method is suitable for processing incomplete data structure which contains at least one noisy data element.

Figure 6:
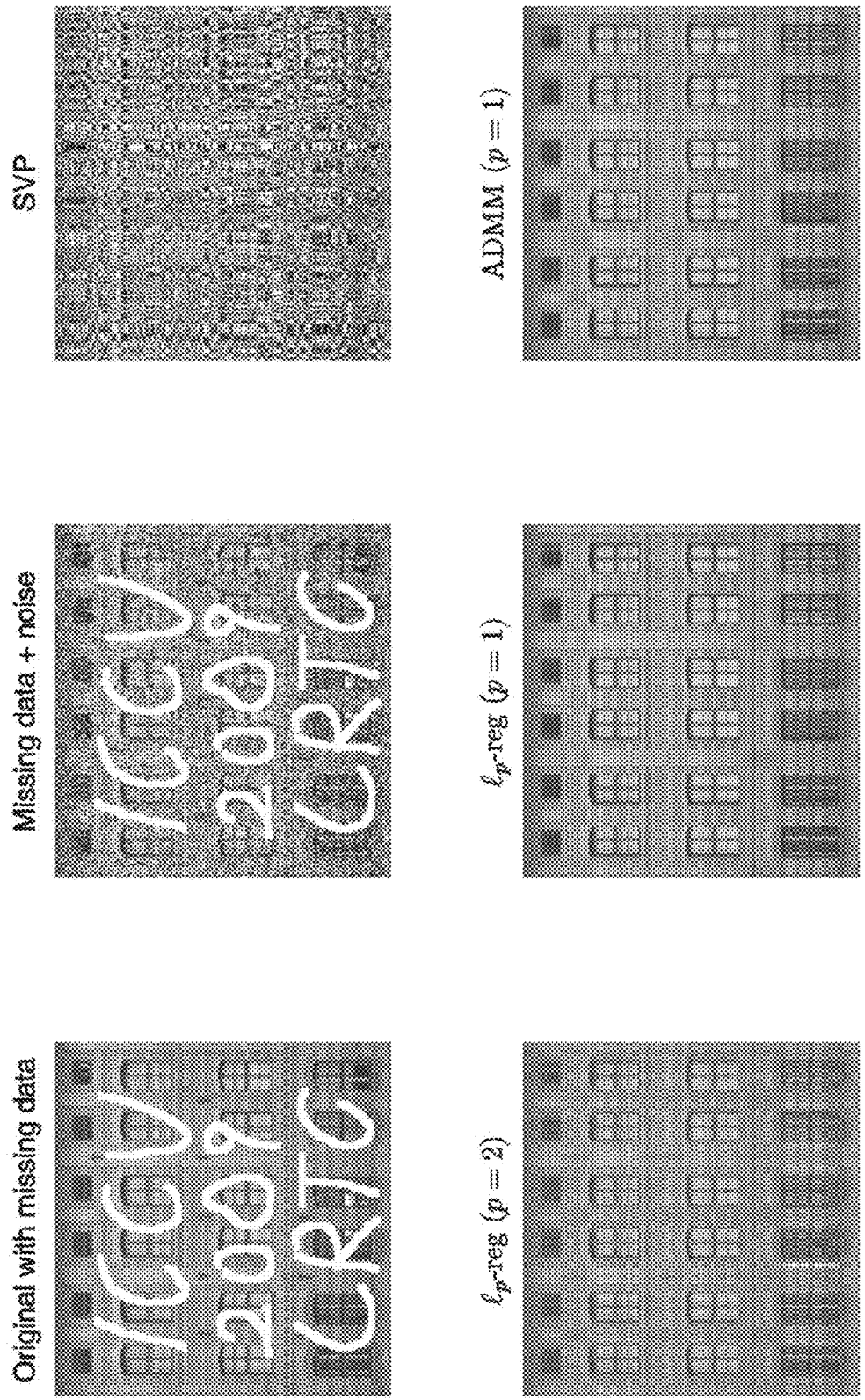
FIG. 6 is a set of source and output images showing results of image inpainting in salt-and-pepper noise processed with the methods in accordance with embodiments of the present invention and other alternative methods.

With reference to FIG. 6, matrix completion may also applied to image inpainting in salt-and-pepper noise. Preferably, the source image 206 may be converted to a grey-scale image, and the grey-scale image may then be represented by the matrix representation.

The missing data of the source image 206 correspond to "ICCV", "2009", and "LRTC" in the image. In addition, the available entries are contaminated by adding salt-and-pepper noise. For all methods, the rank is set to r=6.

The SVT method shows divergence and it is observed that SVP fails in recovering the image. In contrast, the $\ell_p$-regression and ADMM with p=1 are quite robust to the salt-and-pepper noise and they provide rather good estimates of the original image. It is also observed that the $\ell_1$-regression greatly improves the performance compared with the $\ell_2$-regression in impulsive noise environment. The CPU times of the SVP, $\ell_p$-regression with p=2 and p=1 and ADMM with p=1 are 20.3 s, 0.4 s, 7.8 s and 4.9 s, respectively.

These experimental results show that the embodiments of the present invention may converge faster than SVT and SVP since the computational complexity of the present invention is linear with the number of observed entries and hence it is scalable, even for the noise-free condition.

Although not required, the embodiments described with reference to the Figures can be implemented as an application programming interface (API) or as a series of libraries for use by a developer or can be included within another software application, such as a terminal or personal computer operating system or a portable computing device operating system. Generally, as program modules include routines, programs, objects, components and data files assisting in the performance of particular functions, the skilled person will understand that the functionality of the software application may be distributed across a number of routines, objects or components to achieve the same functionality desired herein.

It will also be appreciated that where the methods and systems of the present invention are either wholly implemented by computing system or partly implemented by computing systems thus any appropriate computing system architecture may be utilised. This will include standalone computers, network computers and dedicated hardware devices. Where the terms "computing system" and "computing device" are used, these terms are intended to cover any appropriate arrangement of computer hardware capable of implementing the function described.

It will be appreciated by persons skilled in the art that the term "database" may include any form of organized or unorganized data storage devices implemented in either software, hardware or a combination of both which are able to implement the function described.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

Any reference to prior art contained herein is not to be taken as an admission that the information is common general knowledge, unless otherwise indicated.

The invention claimed is:

1. A method for processing a data structure, comprising the step of:
providing an incomplete data structure arranged to represent source information, wherein the incomplete data structure is a low-rank matrix containing a plurality of data elements;
processing the incomplete data structure to determine at least one estimated data element of an output data structure;
transforming the source information to output information associated with the output data structure based on a combination of the incomplete data structure and the at least one estimated data element; and
wherein the step of processing the incomplete data structure includes factorizing the low-rank matrix and processing $\ell_F$-norm minimization of residual with $0<p\leq2$.

2. The method for processing a data structure in accordance with claim 1, wherein the incomplete data structure contains at least one noisy data element.

3. The method for processing a data structure in accordance with claim 1, wherein at least one of the plurality of data elements is missing in the incomplete data structure.

4. The method for processing a data structure in accordance with claim 3, wherein the output data structure includes the at least one estimated data element filled in at least one corresponding missing entries in the incomplete data structure.

5. The method for processing a data structure in accordance with claim 1, wherein the matrix is filled with the plurality of data elements.

6. The method for processing a data structure in accordance with claim 1, wherein the step of processing the incomplete data structure further comprises a step of processing the factorized low-rank matrix by solving a $(n_1+n_2)$ linear $\ell_F$-regression problem, wherein $n_1$ and $n_2$ denote a row number and a column number of the low-rank matrix.

7. The method for processing a data structure in accordance with claim 6, wherein the process of solving a $(n_1+n_2)$ linear $\ell_F$-regression problem involves an iterative process.

8. The method for processing a data structure in accordance with claim 7, wherein the iterative process is an iteratively reweighted least squares process.

9. The method for processing a data structure in accordance with claim 1, wherein the step of processing the incomplete data structure further comprising a step of applying an alternating direction method of multipliers in an $\ell_F$-space.

10. The method for processing a data structure in accordance with claim 9, wherein the step of applying the alternating direction method of multipliers in an $\ell_F$-space includes solving a least squares matrix factorization problem in each of a plurality of iterations.

11. The method for processing a data structure in accordance with claim 10, wherein the least squares matrix factorization problem is solved using a linear least squares regression process.

12. The method for processing a data structure in accordance with claim 9, wherein the step of applying the alternating direction method of multipliers in an $\ell_F$-space includes obtaining a proximity operator of a $p^{th}$ power of the $\ell_F$-norm.

13. The method for processing a data structure in accordance with claim 12, wherein the proximity operator includes a closed-form solution for $p=1$.

14. The method for processing a data structure in accordance with claim 12, wherein obtaining the proximity operator of a $p^{th}$ power of the $\ell_F$-norm includes root finding of a scalar nonlinear equation for $p<1$.

15. The method for processing a data structure in accordance with claim 1, wherein the source information is a source image including a missing portion.

16. The method for processing a data structure in accordance with claim 15, wherein the output information is an inpainted image based on the source image.

17. A method for image processing, comprising the steps of:
transforming a source image to a matrix representation including a data structure;
processing the data structure with the method in accordance with claim 1 so as to modify the matrix representation including the output data structure; and
transforming the modified matrix representation to an output image.

18. The method for image processing of claim 17, further comprising the step of converting the source image to a gray-scale image, wherein the gray-scale image is represented by the matrix representation.

19. A system for use in processing a data structure, comprising:
a transformation module arranged to generate an incomplete data structure representing source information, wherein the incomplete data structure is a low-rank matrix containing a plurality of data elements; and
a processing module arranged to process the incomplete data structure so as to determine at least one estimated data element of an output data structure;
wherein the transformation module is further arranged to transform the source information to output information associated with the output data structure based on a combination of the incomplete data structure and the at least one estimated data element; and wherein the processing module is arranged to process the incomplete data structure by factorizing the low-rank matrix and processing $\ell_{F_p}$-norm minimization of residual with $0<p\leq2$.

20. The system in accordance with claim 19, wherein the incomplete data structure contains at least one noisy data element.

21. The system in accordance with claim 19, wherein at least one of the plurality of data elements is missing in the incomplete data structure.

22. The system in accordance with claim 21, wherein the output data structure includes the at least one estimated data element filled in at least one corresponding missing entries in the incomplete data structure.

23. The system in accordance with claim 19, wherein the data structure includes a matrix filled with the plurality of data elements.

24. The system in accordance with claim 19, wherein the source information is a source image including a missing portion.

25. The system in accordance with claim 24, wherein the output information is an inpainted image based on the source image.

26. The system in accordance with claim 19, wherein the transformation module is further arranged to convert the source image to a gray-scale image, wherein the gray-scale image is represented by the incomplete data structure.

* * * * *